United States Patent [19]

Rukovena

[11] Patent Number: 5,314,645
[45] Date of Patent: May 24, 1994

[54] PACKING ELEMENT

[75] Inventor: Frank Rukovena, Tallmadge, Ohio

[73] Assignee: Norton Chemical Process Products Corp., Worcester, Mass.

[21] Appl. No.: 7,866

[22] Filed: Jan. 22, 1993

[51] Int. Cl.⁵ .............................................. B01F 3/04
[52] U.S. Cl. ................................ 261/94; 261/DIG. 72
[58] Field of Search ........................ 261/94, DIG. 72

[56] References Cited

U.S. PATENT DOCUMENTS

| Re. 27,217 | 11/1971 | Eckert | 261/94 |
|---|---|---|---|
| 2,602,651 | 7/1952 | Cannon | 261/DIG. 72 |
| 3,167,600 | 1/1965 | Worman | 261/94 |
| 3,430,934 | 3/1969 | Weishaupt | 261/DIG. 72 |
| 3,567,192 | 3/1971 | Kerze, Jr. | 261/94 |
| 3,957,931 | 5/1976 | Ellis et al. | 261/98 |
| 4,041,113 | 8/1977 | McKeown | 261/98 |
| 4,067,936 | 1/1978 | Ellis et al. | 261/98 |
| 4,122,011 | 10/1978 | Strigle, Jr. | 210/150 |
| 4,197,264 | 4/1980 | Degg | 261/98 |
| 4,203,934 | 5/1980 | Leva | 261/98 |
| 4,275,019 | 6/1981 | Bednarski | 261/DIG. 72 |
| 4,277,425 | 7/1981 | Leva | 261/98 |
| 4,303,599 | 12/1981 | Strigle, Jr. et al. | 261/98 |
| 4,333,892 | 6/1982 | Ellis et al. | 261/98 |
| 4,600,544 | 7/1986 | Mix | 261/79 A |
| 4,806,288 | 2/1989 | Nowosinski et al. | 261/94 |

FOREIGN PATENT DOCUMENTS

| 0070918 | 2/1983 | European Pat. Off. | 261/DIG. 72 |
|---|---|---|---|
| 8505287 | 12/1985 | World Int. Prop. O. | 261/DIG. 72 |

Primary Examiner—Tim Miles
Attorney, Agent, or Firm—David Bennett

[57] ABSTRACT

Packing elements of the Pall ring type having improved resistance to crushing even though made from thinner gauge metal can be obtained by providing attachment means that hold overlapping ends of the ring together and resist deformation.

6 Claims, 1 Drawing Sheet

PACKING ELEMENT

BACKGROUND OF THE INVENTION

This invention relates to packing elements use in mass transfer and direct heat transfer applications and specifically to packing elements of a generally cylindrical shape, such as for example Pall rings.

Such elements are used in reactors where liquids and gases are contacted so as to bring about a reaction, heat transfer, solution or dissolution operations by intimately contacting two flowing fluids. As a consequence they have shapes designed to maximize surface area while retaining dimensional stability such they they do not collapse or become crushed during use. One means of achieving this end is to form the rings from cylindrical metal blanks, and providing internal structure by a variety of suitable techniques.

It is however desirable to have a structure that is easily produced to a standard design in large volumes. To satisfy these requirements the elements are often stamped out of a flat metal plate intended to be bent into a cylindrical shape with a plurality of flaps cut from the plate and bent inwards towards the axis of the cylinder. This is the shape of the typical Pall ring and is described for example in Reissue U.S. Pat. No. 27,217.

In order to retain the rigidity of such a ring it needs to be shaped from a relatively thick metal plate that will have be able to withstand the compressive forces encountered in use. Lacking such rigidity the rings will become compressed under the loading in the tower and more rings will be needed to fill the tower. In addition compressed rings do not have the same performance characteristics such that some predictability in operation is lost.

On the other hand it is desirable to reduce the thickness of this metal plate to save weight and to make the rings less expensive.

One solution has been to use a pair of bridging members to hold two cooperating semicylindrical pieces together as is described in U.S. Pat. No. 4,197,264. This has a significant disadvantage in that the production process requires the combination of four separate components to make the final product.

The present invention provides a relatively rigid packing of the Pall ring type while allowing the use of thinner gauge metal. The ring structure is so designed that it can be made from a single strip of metal in a simple cutting and bending operation readily adapted to the use of mass production techniques.

DESCRIPTION OF THE INVENTION

The present invention provides a packing element formed by bending a flat metal strip into a generally cylindrical form wherein overlapping ends of the bent strip are provided with attachment means which releasably engage to hold the ends together when the ends are overlapped.

The attachment means can have any convenient form but a generally adaptable and advantageous attachment means comprises flaps bent inwardly towards the axis of the cylinder in the area of overlap of the ends of the strip and the cooperating slots formed by the cutting of the flaps, with one end bearing a flap projecting away from the said end and the opposed end having a flap in the area of overlap projecting towards the said end such that the flap projecting backwards fits into the slot formed by the cutting of the forward projecting flap.

The flap can have any convenient shape such triangular or rectangular but a simple, rectangular shape is often all that is required. Its length should be adequate to prevent unintended disengagement during use but not so long as to require extensive deformation of the cylinder to engage and disengage. The cooperating flaps are preferably located at the midpoint of the ends in the axial direction and generally one pair is enough. It is however possible to employ two or more cooperating pairs to give added stability.

Such packing rings have a rigidity that greatly exceeds that of the prior art rings without the attachment means. This rigidity can be further enhanced by providing the rings with peripheral flanges formed on the longitudinal edges of the metal strip such that, in the packing ring, the flanges will be formed around the top and bottom ends of the rings. The flanges preferably project in such a direction the will not impede the bending of the strip into a ring shape. Thus in the finished ring the flanges project radially outwards rather than inwards. One of the flanges preferably terminates short of the ends of the strip such that the flanges do not contact when the attachment means are engaged but permit a limited degree of flexing of the ring before they come into contact. This contact limits the amount of deformation that can occur in normal use and renders the ring quite rigid. The flange however does not prevent disengagement of the preferred attachment means, (comprising flap and cooperating slot), which can be released by deforming the overlapped end inwards, (but not the overlapping end), so as to disengage the flap from the cooperating slot.

The metal from which such rings are made is largely dictated by the environment in which it is designed to be used. Since this is often corrosive to some degree, it is conventional to use a resistant steel such as stainless steel, which is usually costly.

The gauge of the metal strip from which a Pall ring or similar structure is conventionally constructed is from about 0.65 mm to 1.00 mm and more typically from about 0.75 mm to about 0.85 mm. The improved packing ring structure of the present invention allows the use of metal strip of gauge down to about 0.10 mm and preferred packing ring structures are constructed from metal strips of 0.15 mm to 0.60 mm gauge.

The conventional Pall ring structures are cylinders formed from a bent strip of metal and are provided with a plurality of inward flap projections cut from the bent strip and arcing inwardly toward the axis of the cylinder but terminating short of the axis. The number and size of these projections is not critical and is largely a function of the dimensions of the ring and the desired surface area. The provision of such projections is also a desirable feature of the packing rings of the present invention.

Initial test data indicate that the rings according to the present invention can support up to 950 lb/ft$^2$ which is about equal to the supportable load for a ring of the same dimensions, made from steel strip that is 50% thicker, but which lacks the attachment means that characterizes the rings of the present invention. This means that deeper tower beds of packing can be employed without the need for intermediate support structures to avoid crushing the rings in the lower portions of the tower. In addition the use of thinner gauge steel leads to significant cost advantages for the structure of the present invention.

DRAWINGS

The attached drawings are described as follows.

DESCRIPTION OF PREFERRED EMBODIMENTS

Figure 1:
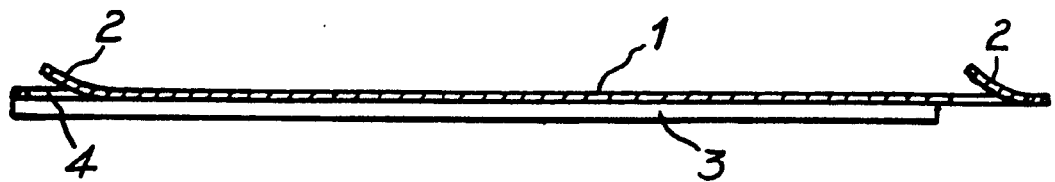
FIG. 1 is a longitudinal cross-section of a metal strip before it is bent into a cylindrical shape showing the attachment means.

The invention will now be further described with specific reference to the embodiment illustrated in the Drawings which are for illustration only and are intended to imply no limitation on the essential scope of the invention.

In the Drawings, and referring initially to FIG. 1, a metal strip, 1, is provided at each of its extremities with flaps, 2, punched out of the strip to leave slots, 4. The strip is also provide with flanges, 3, along the longitudinal edges terminating short of the end of the strip.

Figure 2:
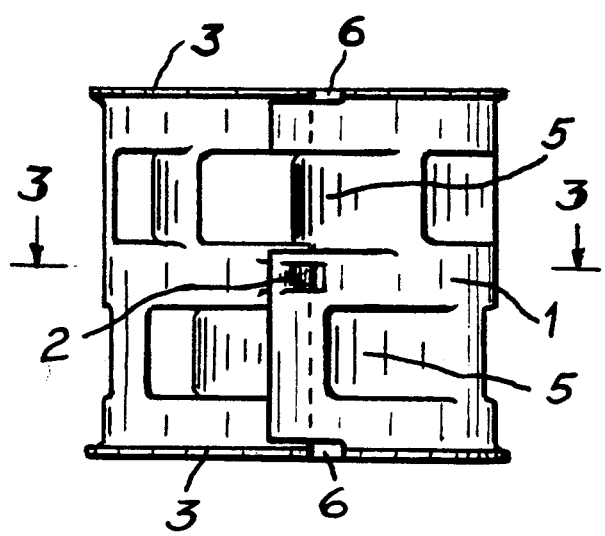
FIG. 2 is side view of a Pall ring having the structure of the present invention.

FIG. 2 shows the strip of FIG. 1 bent to form a cylindrical structure with one end overlapping the opposed end such that the flap on the overlapping end engages the slot on the end beneath the overlapping end and the tendency of the strip to straighten holds the ends in locking relationship with the flaps on opposed ends in contact.

FIG. 2 also shows a flexing space, 6, between the flanges on opposed ends of the strip. This allows the ends to increase the degree of overlap slightly so as to permit engagement and disengagement of the flaps and slots that comprise the attachment means but resist any further deformation when the flange ends come into contact.

FIG. 2 also shows the inwardly directed projections, 5, that are stamped from the sheet and are deformed inwardly towards the axis of the cylinder, usually after the cylinder has been formed. Typically there are from four to eight such projections arranged in the same plane perpendicular to the axis of the cylinder. The preferred embodiment shown in FIGS. 2 and 3 has two sets of five projections arranged in two planes, one above the plane of the attachment means and one below the plane of the attachment means.

Figure 3:
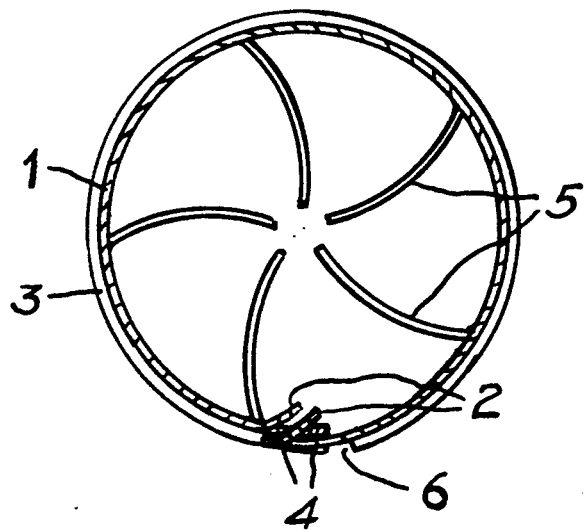
FIG. 3 is a cross-section of the ring shown in FIG. 2 in along the line 2—2.

FIG. 3 is a cross-section along the plane 2—2 in FIG. 2 and is designed to show in detail the interaction of the flaps 2, with the slots, 4, to form the attachment means.

The attachment means shown in the above drawings could be replaced with other structures capable of performing the same task such as the formation of curls of opposite sense, (that is, one up and one down), on the ends of the strip so as to permit engagement of the curled portions when the ring is formed. Packing rings with other interlocking means to achieve the same objective could be devised and all such are understood to be within the purview of this invention.

I claim:

1. A packing element formed by bending a metal strip into a generally cylindrical shape with overlapping ends, said ends being provided with attachment means which releasably engage to hold the ends together when overlapped, wherein the attachment means comprises at least one pair of flaps projecting from the plane of the strip at essentially the same angle and in the same direction, with each flap located adjacent an end of the strip in the region of overlap when the element is formed, and at least one cooperating slot adjacent one of the flaps such that the flap formed on the opposed end engages with the slot when the element is formed.

2. A packing element according to claim 1 in which the attachment means comprises at least one pair of flaps stamped out of the strip and projecting from the plane of the strip at essentially the same angle and in the same direction, with each flap located adjacent an end of the strip in the region of overlap when the element is formed, and cooperating slots formed when the flaps are produced, such that the flap on one end engages with the cooperating slot on the other end.

3. A packing element according to claim 1 having two or more attachment means.

4. A packing element according to claim 1 in which the cylinder ends are provided with flanges which act to limit the degree of overlap of the ends of the strip from which the cylindrical element was formed.

5. A packing element according to claim 1 in which a plurality of projections are provided extending from the cylinder wall and generally towards the axis of the cylinder.

6. A packing element according to claim 1 in which the element is stamped from a strip of metal from 0.10 to 0.60 mm in thickness.

* * * * *